United States Patent
Stoller et al.

[15] 3,635,510
[45] Jan. 18, 1972

[54] HEAT SEAL OF A GLASS MEMBER TO ANOTHER MEMBER

[72] Inventors: Arthur Irwin Stoller, North Brunswick; William Henry Schilp, Jr., Flemington, both of N.J.

[73] Assignee: RCA Corporation

[22] Filed: Nov. 20, 1969

[21] Appl. No.: 878,511

[52] U.S. Cl. .................... 287/189.365, 29/472.9, 117/135.1
[51] Int. Cl. .................................... C03c 17/30, C03c 17/00
[58] Field of Search .............. 156/321, 272; 29/472.9, 590, 29/589; 148/6.3; 117/135.1; 287/189.36 S

[56] References Cited

UNITED STATES PATENTS 3,419,761  12/1968  Pennebaker .................... 29/590 X
2,988,853   6/1961  Certa .......................... 148/6.3 X
2,836,935   6/1958  Stanworth et al. ............... 148/6.3 X
3,219,482  11/1965  Jenkin ......................... 148/6.3 X

OTHER PUBLICATIONS

Arthur and Elizabeth Rose, The Condensed Chemical Dictionary, Sixth Edition, pp. 1019–20.

Primary Examiner—Carl D. Quarforth
Assistant Examiner—E. E. Lehmann
Attorney—Glenn H. Bruestle

[57] ABSTRACT

The metal or semiconductor member is provided with a coating of silicon nitride and heat sealed to a glass member. The silicon nitride coating is readily wet by hot glass to form a rugged, vacuumtight seal.

2 Claims, 6 Drawing Figures

PATENTED JAN 18 1972　　　　　　　　　　3,635,510

INVENTORS
ARTHUR I. STOLLER &
BY WILLIAM H. SCHILP, JR.

Volker R. Ulbrich
Attorney

HEAT SEAL OF A GLASS MEMBER TO ANOTHER MEMBER

BACKGROUND OF THE INVENTION

The invention relates to the art of sealing together two members by heating at least one of the members to its softening temperature, and relates particularly to the sealing of metal to glass for electron tube applications.

Most metals are not readily wet by hot glass. In order to heat-seal metals to glass, it is generally necessary to provide the metal with a wettable coating that adheres well to the metal and which will also be readily wet by glass. Several metals, such as tungsten, may be readily oxidized to form a wettable oxide coating. However, some other metals, especially molybdenum, are particularly difficult to seal to glass.

Molybdenum has several desirable properties for electron tube applications. It has considerable mechanical strength, it has a coefficient of expansion near that of most common glasses, and it is entirely nonmagnetic. Nevertheless, the use of molybdenum in combination with glass in electron tube applications is very limited due to the many difficulties generally encountered in the sealing of molybdenum to glass. Some of these difficulties are described, for instance, in *Handbook of Materials and Techniques for Vacuum Devices*, by Walter H. Kohl, pages 412–415. When molybdenum is heated in air to near normal glass-sealing temperatures, a heavy, powdery oxide is rapidly formed on its surface and a dense smoke is given off. This powdery oxide does not have sufficient strength to be sealed to the glass and is not readily wet by the glass. Thus, it is presently not feasible to seal untreated molybdenum to a glass member in normal atmosphere with an open flame.

One method of treating a molybdenum metal member so that it may be sealed to a glass member is that of silicising. Silicising is described, for instance, in the U.S. Pat. No. 2,836,935, to Stanworth et al. In silicising, a heated molybdenum member is exposed to a gaseous halide of silicon which decomposes at the surface to form an adherent coating which is believed to be a mixture of molybdenum silicides. The effect of the silicide coating is to seal the molybdenum from the ambient atmosphere, so that when the molybdenum member is heated in open air with the glass in the sealing process, it is resistant to oxidation.

Silicising has several disadvantages, however. One disadvantage is that overheating of the metal during sealing results in bubble formations in the glass. Bubbles in the glass generally weaken the seal. Moreover, the silicising of the molybdenum changes the expansion characteristics of the molybdenum member. This change results in undesirable strains in the glass. Besides being a relatively expensive process, silicising can result in a substantial change in the total dimensions of the molybdenum member. The change must be compensated for in the design of the metal member. As a practical matter, silicising is specific to molybdenum and tungsten and is of little use in sealing other metals to glass. Thus, special equipment necessary for silicising is relatively useless in sealing other materials to glass.

SUMMARY OF THE INVENTION

A novel method of sealing a first member to a second, vitreous member comprises coating the surface of the first member with silicon nitride and heat-sealing the second material to the silicon nitride coating. The invention includes also a novel seal comprising a first member having a surface coating of silicon nitride and a second vitreous member sealed to the coating.

When a molybdenum member is sealed to a glass member by the novel method, there is no significant change in either the dimensions or in the coefficient of expansion of the molybdenum member. The resulting seal generally contains no undesirable bubble formations and is unaffected by normal humidity and temperature conditions. The seal is exceptionally rugged. Furthermore, the novel method can be used to seal a variety of metals, ceramics and semiconductors to glass.

DESCRIPTION OF THE PREFERRED EMBODIMENTS

Example 1

Figure 1:
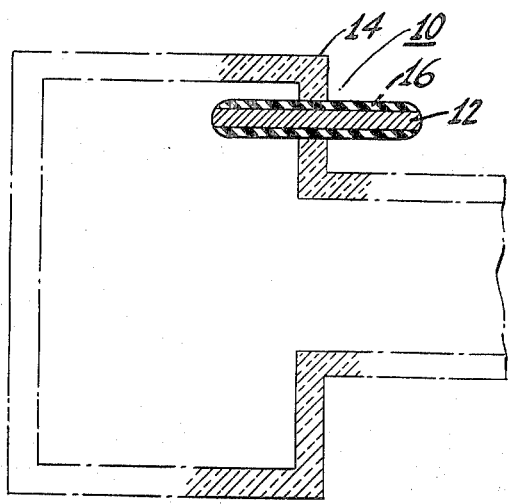
FIG. 1 is a side sectional view of a portion of a glass electron tube envelope through which a metal pin is sealed by the novel method.

In one embodiment of the novel method, a seal 10 shown in FIG. 1 is made by sealing a coated molybdenum pin 12 about 0.040 inch in diameter and about 3½ inches long through a shoulder 14 of a borosilicate glass envelope for a 3½-inch image orthicon television camera tube. The pin 12, after being cleaned and degassed, is coated with a silicon nitride coating 16 by heating the pin in an atmosphere consisting essentially of silicon hydride, ammonia, and argon at about 800° C. for about 2 minutes. The coating 16 forms by vapor deposition, according to a chemical reaction which is believed to be:

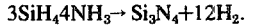

$$3SiH_4 + 4NH_3 \rightarrow Si_3N_4 + 12H_2.$$

The coated pin 12 is placed in a graphite mold having a cavity shaped according to the desired glass shoulder 14. The mold cavity is filled with glass frit. The mold is then heated in nitrogen to a temperature of about 700° C., at which temperature the glass frit fuses together and wets the pin to form the desired seal and glass shoulder 14 in one operation. The shoulder 14 is sealed to the remainder of the envelope in a separate operation.

Example 2

Figure 2:
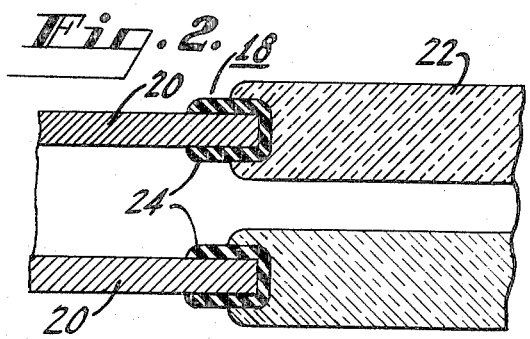
FIG. 2 is a sectional view of a metal tube member that is butt-sealed to a glass tube member by the novel method.

In another embodiment of the novel method, a butt-end seal 18 shown in FIG. 2 is made between a length of molybdenum tubing 20 and a length of glass tubing 22. The molybdenum tubing 20, after being cleaned and degassed, is first coated on one end, outside and inside, with a silicon nitride coating 24 as in example 1. Then, the molybdenum tubing 20 is sealed to the glass tubing 22 in air and on a glass-working lathe by conventional butt-sealing techniques using a gas torch.

Example 3

Figure 3:
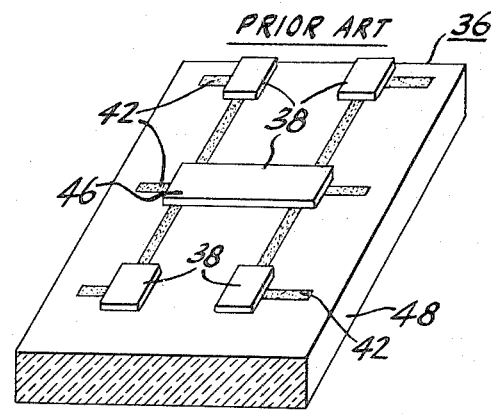
FIG. 3 is an elevated view of an electronic device fabricated by the novel method.
Figure 4:
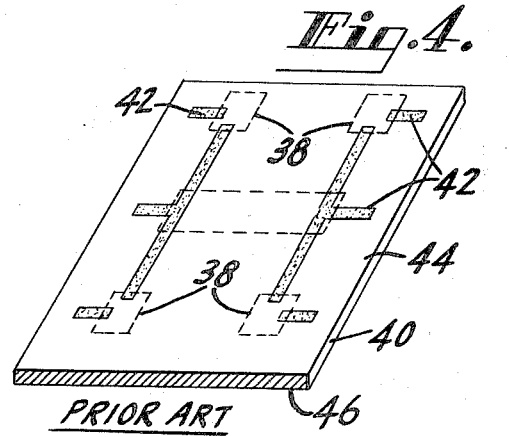
FIG. 4 is an elevated view of a portion of the device of FIG. 3 during fabrication.

The novel method has been found useful in the fabrication of semiconductor devices such as the decal-type integrated circuit 36 shown in FIG. 3. In the fabrication of the circuit 36 it is generally the practice to form its components 38 in a single silicon wafer 40 shown in FIG. 4. A metallized pattern of tungsten contacts 42 is deposited on a first face 44 of the wafer 40 to contact and to connect the components 38 where appropriate. For contacts 42 which are to be connected to the outside world or to the opposite, second face 46 of the wafer 40, the contacts 42 are extended beyond the components 38 some distance. The metallized first face 44 of the wafer 40 is then heat bonded to a vitreous insulating substrate 48 of FIG. 3 such as glass. A photoresist masking layer is formed on the second face 46 of the wafer 40 and the silicon between components 38 is etched away to expose the extended contacts 42 and to electrically insulate the components 38 from one another where such insulation is desired as shown in FIG. 3.

Figure 5:
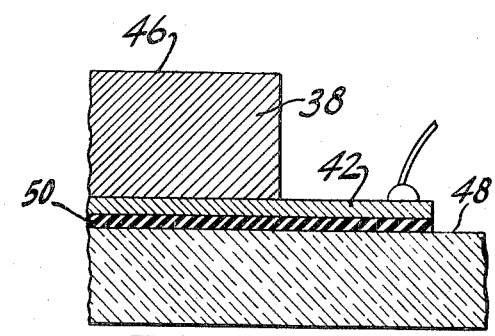
FIG. 5 is a sectional view of a portion of a component of FIG. 3, together with other closely associated structure of the device of FIG. 3.

It has been found that by providing the tungsten metallization contacts 42 with a coating 50 of silicon nitride before bonding, the adhesion of the contacts 42 to the glass substrate 48 is improved. The coating 50 of silicon nitride as shown in FIG. 5 may be formed by vapor deposition as in example 1. The improved adhesion results in an improved yield in the fabrication of the circuit 36 by reducing a tendency of the exposed contacts 38 to peel off the glass substrate 48 and to break off when electrical connections are made to them.

Figure 6:
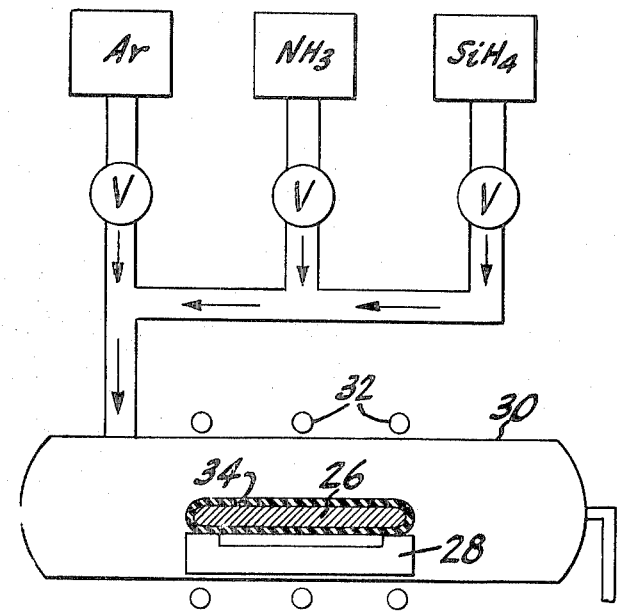
FIG. 6 is a schematic diagram of a system for coating the pin of FIG. 1 prior to forming the seal of FIG. 1.

FIG. 6 is a schematic diagram of a system that may be used for vapor depositing the silicon nitride coating 16 on the molybdenum pin 12 of FIG. 1 or on the tubing 20 of FIG. 2. A cleaned and degassed member 26 to be coated is placed in a graphite susceptor block 28 about 1½ inches wide, one-half inch thick and 4 inches long in a partially closed, fused quartz reaction chamber tube 30 of about 2 inches inside diameter and about 18 inches long. The chamber 30 is charged with argon flowing through the chamber at a rate of about 1 liter per minute for about 10 minutes. The metal member 26 is heated by a radiofrequency heating coil 32 to between about 650° C. and 1,500° C. The temperature is not particularly critical. The argon flow is then stopped and ammonia is introduced with a flow rate of about 85 cc. per minute. The metal member 26 is allowed to equilibrate for about 15 minutes in the ammonia atmosphere at a temperature of between about 650° C. to 1,500° C. to reduce deleterious oxides. With the ammonia continuing to flow, a mixture of 3 percent silane and 97 percent hydrogen is introduced with a flow rate of about 33 cubic centimeters per minute. The reaction of the silane with the ammonia forms on the sample a thin silicon nitride coating 34 which is deposited to a thickness of a few thousand Angstroms. When the desired thickness has been deposited, an argon flow of about 1 liter per minute is initiated, the silane, hydrogen, and ammonia flows are stopped, and the radiofrequency heating coil 32 is shut off. After the system has cooled, the coated metal member 26 is removed.

GENERAL CONSIDERATIONS

The novel method is applicable to the sealing of a number of different materials to vitreous materials. By vitreous materials is meant at least most commonly used glasses and glass frits. Tests indicate that members consisting entirely or predominantly of at least nickel, copper, iron, molybdenum, silver, gold, "Kovar," tantalum, or silicon, when coated with silicon nitride, will be wet by molten glass and will form a strong bond with it. There is good reason to believe that a number of metals, ceramics, semiconductors, and alloys of metals or semiconductors can be sealed to glass by the novel method, provided that they have a high enough melting temperature and are stable enough to withstand the coating and sealing processes and that a strongly adherent silicon nitride coating can be formed on them. For materials which are themselves wet by glass, a silicon nitride coating may further improve the quality of a seal of the material to glass. For instance, although tungsten forms a strong oxide coating suitable for sealing to glass, a silicon nitride coating on the oxide coating may improve somewhat the sealing properties. However, the sealing properties are generally considerably better when the silicon nitride is deposited directly on metal than when it is deposited on an oxide layer already on the metal.

The novel method is particularly useful for sealing members of silicon and silicon alloys. Though certain types of glass do not ordinarily wet silicon, such glasses have been found to wet a silicon nitride coating on the silicon. Thus, the novel method is applicable to the manufacture of silicon devices in which silicon components are electrically isolated by, or packaged in, a vitreous material.

The novel method requires less skill than is required for present methods. An operator who makes, for instance, a glass-to-metal seal, need not be concerned with such things as obtaining and retaining a layer of oxide on the metal as is presently required for tungsten-to-glass seals. Furthermore, with the novel method there is no adverse reaction of the glass with the metal or its oxide. The composition of an alloy to be sealed to glass may be selected without regard to the glass wetting properties of the alloy or to the metal adherence of its oxide. The silicon nitride coating of the novel method is simply applied to the clean alloy. Even nonoxidizing metals, such as gold, may thus be readily sealed to glass.

In making vacuum tube structures by present methods, it frequently happens that an oxide coating on a metal member deteriorates upon heating and portions of it are carried into the tube as contaminants. This results in degraded performance. Such contamination does not occur with the novel method, since the silicon nitride coating is stable even at the elevated temperatures necessary for sealing.

A particular advantage of the novel method is that metal members may be degassed and coated with silicon nitride, all in one furnace operation, thus saving time and expense. Since the silicon nitride coating, though being quite thin, is unusually impermeable to gases in the air, the coated metal parts may be stored in air for long periods of time without reabsorbing gas from the atmosphere.

The thickness of the silicon nitride coating is not very critical. The coating should be thick enough to form a gastight barrier and to be continuous over the surface of the coated member. Yet, the coating should not be so thick that it cracks on being suddenly heated. Generally, a thickness of between 500 and 5,000 angstroms is desirable. Vapor deposition of the coatings may be achieved from gaseous mixtures other than silane and ammonia, so long as they contain some source of nitrogen and a source of silicon. Some materials have too low a melting temperature to be coated with silicon nitride by vapor deposition. Also, some materials have such a high-vapor pressure at elevated temperature that they decompose at temperatures required for vapor deposition. For such materials where vapor deposition is not feasible, another method, such as sputtering, may be used to apply a silicon nitride coating.

We claim:
1. An article of manufacture, comprising:
   a. a self-supporting metal member;
   b. a strongly adherent coating of silicon nitride on the surface of said metal, member, and
   c. a vitreous member heat-sealed to said silicon nitride coating.
2. The seal defined in claim 1 and wherein said metal is molybdenum.

* * * * *